(12) United States Patent
Kuhl et al.

(10) Patent No.: US 10,604,064 B2
(45) Date of Patent: Mar. 31, 2020

(54) MOTOR VEHICLE HAVING A SURROUNDINGS LIGHTING DEVICE

(71) Applicant: Bayerische Motoren Werke Aktiengesellschaft, Munich (DE)

(72) Inventors: Patrick Kuhl, Neubiberg (DE); Thomas Hausmann, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 31 days.

(21) Appl. No.: 16/109,209

(22) Filed: Aug. 22, 2018

(65) Prior Publication Data

US 2018/0361915 A1   Dec. 20, 2018

Related U.S. Application Data

(63) Continuation of application No. PCT/EP2017/052114, filed on Feb. 1, 2017.

(30) Foreign Application Priority Data

Feb. 23, 2016   (DE) .......... 10 2016 202 752

(51) Int. Cl.
  *B60Q 1/24*   (2006.01)
  *B60Q 1/26*   (2006.01)
  (Continued)

(52) U.S. Cl.
  CPC .............. *B60Q 1/24* (2013.01); *B60Q 1/2665* (2013.01); *B60Q 1/323* (2013.01); *G03B 21/14* (2013.01);
  (Continued)

(58) Field of Classification Search
  CPC ...... B60Q 1/24; B60Q 1/2665; B60Q 1/2669; B60Q 1/323; B60Q 2400/50
  (Continued)

(56) References Cited

U.S. PATENT DOCUMENTS 9,247,222 B2   1/2016   Sieler et al.
9,321,395 B2 *  4/2016   Ammar .................... B60R 1/12
(Continued)

FOREIGN PATENT DOCUMENTS

DE         198 05 771 A1    8/1999
DE    10 2004 050 800 A1    4/2006
(Continued)

OTHER PUBLICATIONS

PCT/EP2017/052114, International Search Report dated Apr. 13, 2017 (Three (3) pages).
(Continued)

*Primary Examiner* — William C. Dowling
(74) *Attorney, Agent, or Firm* — Crowell & Moring LLP

(57) ABSTRACT

A motor vehicle has a surroundings lighting device, where the surroundings lighting device includes a first projection module arranged adjacent to a pivotable vehicle door of the motor vehicle in an immobile vehicle bodywork component, where when the first projection module is switched on, the first projection module projects a light distribution onto the ground adjacent to the immobile vehicle bodywork component. A second projection module is arranged on the outside of the vehicle door, where when the second projection module is switched on, the second projection module projects a pictogram onto the ground. The surroundings lighting device is configured to, when an event which is triggered by a user in the surroundings of the motor vehicle is detected, switch on the first projection module and at the same time, or after a delay, switch on the second projection module such that the pictogram is projected onto the light distribution.

20 Claims, 2 Drawing Sheets

(51) Int. Cl.
  *B60Q 1/32* (2006.01)
  *G03B 21/14* (2006.01)
(52) U.S. Cl.
  CPC ...... *B60Q 2400/40* (2013.01); *B60Q 2400/50* (2013.01)
(58) Field of Classification Search
  USPC ..................................................... 353/12, 13
  See application file for complete search history.

(56) References Cited

U.S. PATENT DOCUMENTS

| | | | |
|---|---|---|---|
| 9,707,912 B1* | 7/2017 | Pena Casimiro | .... B60Q 1/2665 |
| 2015/0224919 A1 | 8/2015 | Sobecki et al. | |
| 2015/0298598 A1* | 10/2015 | Nussli | ................. B60Q 1/2665 345/2.2 |
| 2017/0050558 A1* | 2/2017 | Salter | ....................... B60R 1/12 |
| 2017/0210282 A1* | 7/2017 | Rodriguez Barros | . G03B 21/00 |
| 2018/0065537 A1* | 3/2018 | Abrams | ................. B60Q 1/323 |
| 2018/0236929 A1* | 8/2018 | Gocke | ..................... B60Q 1/24 |

FOREIGN PATENT DOCUMENTS

| | | |
|---|---|---|
| DE | 10 2009 024 894 A1 | 12/2010 |
| DE | 20 2011 000 429 U1 | 6/2011 |
| DE | 10 2011 076 083 A1 | 11/2012 |
| DE | 10 2013 016 347 A1 | 4/2014 |
| DE | 10 2013 211 877 A1 | 1/2015 |
| FR | 1 518 902 A | 3/1968 |
| WO | WO 2006/047306 A1 | 5/2006 |

OTHER PUBLICATIONS

German Search Report issued in German counterpart application No. 10 2016 202 752.2 dated Nov. 14, 2016, with Statement of Relevancy (Six (6) pages).

\* cited by examiner

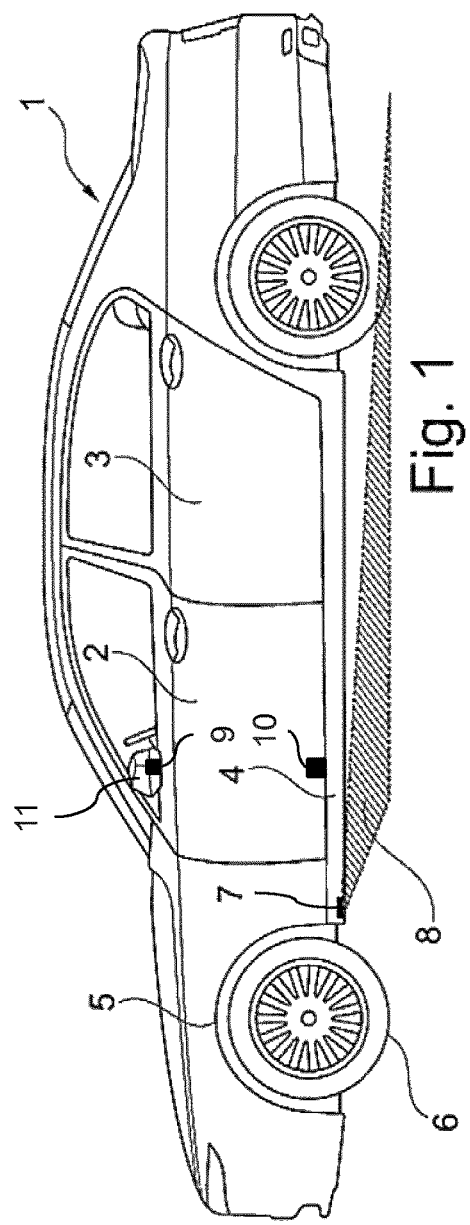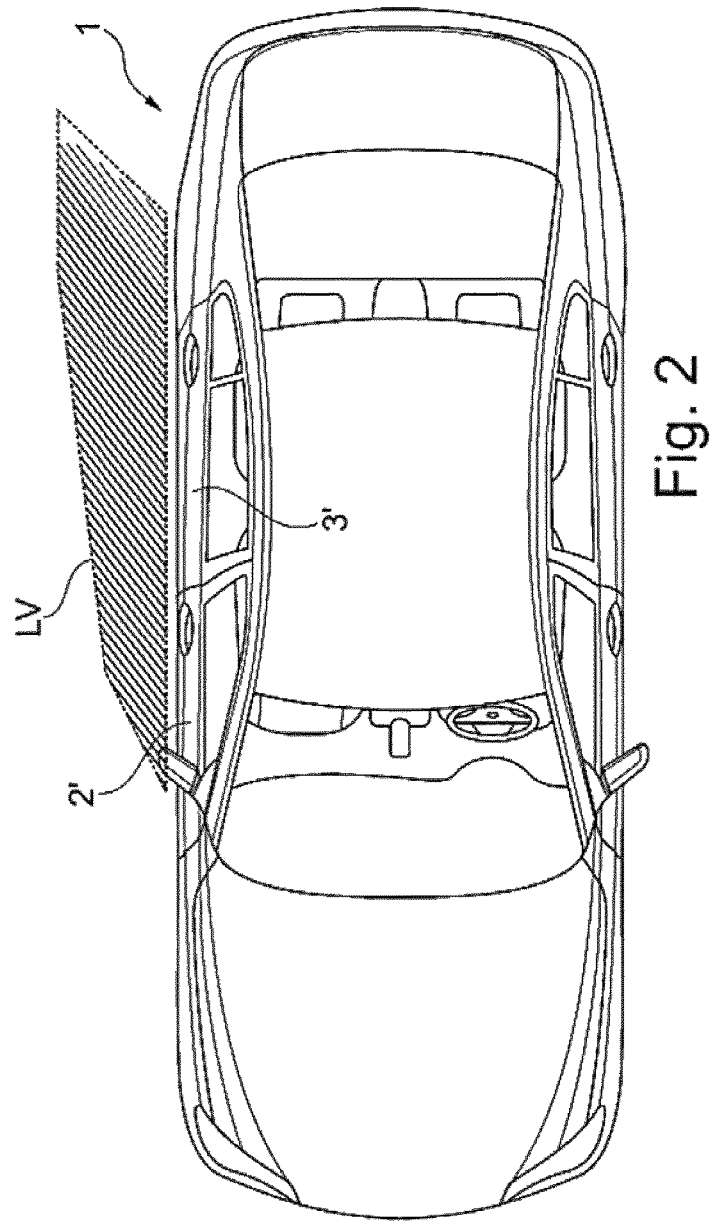

MOTOR VEHICLE HAVING A SURROUNDINGS LIGHTING DEVICE

CROSS REFERENCE TO RELATED APPLICATIONS

This application is a continuation of PCT International Application No. PCT/EP2017/052114, filed Feb. 1, 2017, which claims priority under 35 U.S.C. § 119 from German Patent Application. No. 10 2016 202 752.2, filed Feb. 23, 2016, the entire disclosures of which are herein expressly incorporated by reference.

BACKGROUND AND SUMMARY OF THE INVENTION

The invention relates to a motor vehicle having a surroundings lighting device.

Surroundings lighting devices with which a region of the ground in the surroundings of the motor vehicle can be illuminated are known from the prior art.

Document DE 10 2013 211 877 A1 describes a motor vehicle having a surroundings lighting device which by means of one or more projection modules comprising an array of projection optics system generates a light distribution next to the vehicle in the manner of a carpet of light.

It is also known to integrate a surroundings lighting device into the outer door handle of a vehicle, which surroundings lighting device is actuated when the vehicle is unlocked. Likewise, there are exit lighting systems which are installed in the lower edge of the door trim on the inner side of a vehicle door. Furthermore, it is known to project a logo onto the ground next to a vehicle door by means of a projection module in the external rearview mirror of the vehicle door.

The object of the invention is to provide a motor vehicle with a surroundings lighting device which ensures good and conspicuous illumination of the ground adjacent to a vehicle door.

The motor vehicle according to the invention, which is, in particular, a passenger car, comprises a surroundings lighting device for illuminating a region of the ground in the surroundings of the motor vehicle. The surroundings lighting device includes a first projection module which is arranged in an immobile vehicle body part adjacent to a pivotable vehicle door of the motor vehicle, in particular in a door sill of the vehicle door, and comprises an array which is made of projection optics systems. An immobile vehicle body part is to be understood as being a part of the vehicle bodywork which does not pivot with the vehicle door. When the first projection module is switched on, the array projects, with the light of at least one light source which forms part of the first projection module, a light distribution onto the ground adjacent to the immobile vehicle body part and, in particular, next to the immobile vehicle body part. The vehicle door is, in particular, a passenger entry door of the vehicle such as, for example, the driver's door or front seat passenger's door or, if appropriate, also a rear door. The switching on of the first projection module and also of the second or third projection module described below is generally brought about by the switching on of the associated light source or sources.

In addition to the first projection module, the surroundings lighting device comprises a second projection module which is arranged on the outer side of the vehicle door and therefore pivots together with the vehicle door. This projection module comprises at least one projection optics system which, when the second projection module is switched on, projects, with the light of at least one light source which forms part of the second projection module, a pictogram onto the ground adjacent to and, in particular, next to the vehicle door. Here and in the text which follows, the term pictogram needs to be understood in a broad sense and can be composed not only of figurative illustrations or logos but, preferably, also of text or can comprise corresponding text.

The surroundings lighting device which is installed in the motor vehicle according to the invention is configured in such a way can be controlled by means of a control device in such a way) that when an event which is triggered by a user in the surroundings of the motor vehicle is detected, the first projection module is switched on and at the same time or after a delay the second projection module is switched on, as a result of which the pictogram of the second projection module is projected onto the light distribution of the first projection module (when the vehicle door is closed).

The invention has the advantage that through the use of the first projection module very good illumination of the region adjacent to the vehicle door is achieved, wherein this illumination is configured in a particularly conspicuous and visually attractive fashion as a result of the effect of the inclusion of a pictogram in the illumination.

In one particularly preferred embodiment, a projection display which is described in document DE 10 2009 024 894 A1 or in document DE 10 2011 076 083 A1 (and its corresponding U.S. family member U.S. Pat. No. 9,247,222) or in document DE 10 2013 211 877 A1 which has already been mentioned at the beginning is used as the projection module. The entire content of the disclosure of these documents is incorporated by reference herein in the content of this application. In the first projection module, and preferably also in the second projection module and third projection module which is described further below, one or more LEDs or, if appropriate, also one or more laser diodes are used as light source(s).

In a further preferred embodiment, the first projection module is configured in such a way that each projection optics system of the array which is made from projection optics systems projects an individual image onto the ground, which image essentially covers the entire light distribution, wherein the light distribution is a superimposition of the individual images of the projection optics systems. Likewise, it is possible that each projection optics system of a respective partial array which is made from projection optics systems projects an individual image onto the ground, which image covers essentially the same partial light distribution, wherein each partial light distribution is a superimposition of the individual images of the projection optics systems which thrill part of the partial array. The two embodiments described above ensure the generation of the light distribution (with reduced light brightness) even when the light exit of the projection module is partially soiled. Therefore, the light distribution is not covered or cut off in specific regions.

In one preferred variant, the event which brings about the switching on of the first and second projection modules is an operator control operation of a mobile identification encoder by the user in the surroundings of the motor vehicle, preferably an operator control operation of the mobile identification encoder for unlocking the motor vehicle. Likewise, the event can be the undershooting of a distance between the motor vehicle and the mobile identification encoder. In both cases, the mobile identification encoder is carried along by the user and is assigned to the motor vehicle. The identification encoder therefore constitutes a mobile unit for keyless access to the motor vehicle. The switching on of the first and second projection modules is preferably triggered when each of the events mentioned above is detected. With this variant of the invention it is ensured that the switching on of the first and second projection modules correlates with the spatial proximity or the approach of the user to the motor vehicle, which indicates that the user would like to get into the vehicle.

In a further preferred variant of the motor vehicle according to the invention, when the first projection module is switched on partial regions of the light distribution are successively projected onto the ground until the entire light distribution is projected onto the ground. This can be achieved in that different partial arrays are provided in the array which is made of projection optics systems for illuminating various regions on the ground adjacent to the vehicle, in this variant of the invention, conspicuous dynamics are already generated when the light distribution is projected by the first projection module, in one preferred refinement of the embodiment described above, the light distribution is activated in the manner of rolling out of a carpet of light, e.g., from one end of the vehicle door to the other end thereof.

In a further preferred embodiment, the second projection module is installed in the external rear view mirror of the vehicle door. Likewise, the second projection module can be installed in a camera holder of the vehicle door. The camera holder preferably serves to attach a camera which captures the rear region of the vehicle and in this sense replaces an external rear view mirror.

In a further embodiment of the motor vehicle according to the invention a predefined region in the light distribution which is generated by the first projection module is visually offset with respect to the light of the light distribution adjacent to the predefined region, wherein in this predefined region the pictogram is projected which is generated by the second projection module. For example, the predefined region can constitute a relatively dark section in comparison with the light distribution in the surroundings of this region.

In a further embodiment of the meter vehicle according to the invention, the surroundings lighting device is configured in such a way (i.e., can be controlled by means of a control device in such a way) that after the result is detected and after the first and second projection modules have been switched on the pictogram of the second projection module is immediately switched off or dimmed (i.e., switched off gradually) when the vehicle door is opened. The term dimming can be understood in a broad sense and can comprise a continuous reduction of the brightness or else incremental reduction of the brightness. In this variant of the invention it is taken into account that when the vehicle door is opened the pictogram is moved out of the light distribution by the pivoting of the second projection module.

In a further particularly preferred embodiment, the motor vehicle according to the invention comprises a third projection module which is arranged on the inner side of the vehicle door and comprises at least one projection optics system which, when the vehicle door is opened after the first and second projection modules have been switched on, projects, with the light of at least one light source which forms part of the third projection module, a further pictogram onto the ground adjacent to and, in particular, next to the vehicle door, wherein the further pictogram moves into the light distribution when the vehicle door is opened. As a result, a particularly attractive visual effect is achieved when the corresponding vehicle door is opened.

In one preferred variant, the further pictogram has the same shape and preferably also the same size as the pictogram which is generated by the second projection module. However, the further pictogram is preferably configured in a colored fashion, whereas the first pictogram is preferably a colorless pictogram with only white light portions. In addition, the light distribution which is generated with the first projection module is preferably also a colorless light distribution with only white light portions.

In a further particularly preferred variant of the invention, at the maximum opening angle of the vehicle door the further pictogram is essentially at the same position as the pictogram of the second projection module when the vehicle door is closed. In this way, the effect is generated that a pictogram which moves out of the light distribution is replaced by another pictogram. This embodiment is preferably combined with the variant of the invention described above in which the pictogram of the second projection module is immediately switched off or dimmed when the vehicle door is opened.

In another variant of the motor vehicle according to the invention, the further pictogram which is generated by means of the third projection module is dimmed when the vehicle door is opened, i.e., the brightness of the further pictogram increases slowly. As a result, a further dynamic effect is generated.

The second and third projection modules which are described above preferably comprise just one projection optics system, but can, if appropriate, equally well be configured like the first projection module, i.e., it can also comprise an array of projection optics systems.

Other objects, advantages and novel features of the present invention will become apparent from the following detailed description of one or more preferred embodiments when considered in conjunction with the accompanying drawings.

BRIEF DESCRIPTION OF THE DRAWINGS

FIG. 1 shows a side view of a motor vehicle according to the invention with a surroundings lighting device;

FIG. 2 shows a plan view, of the motor vehicle in FIG. 1; and

DETAILED DESCRIPTION OF THE DRAWINGS

Figure 3:
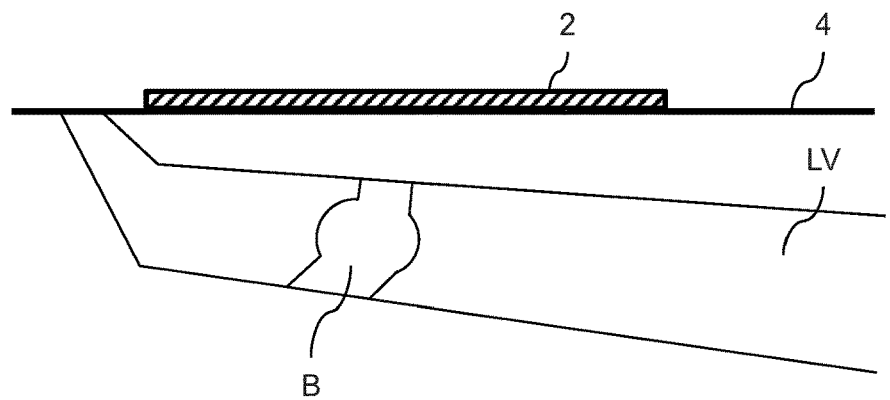
FIGS. 3 to 5 show respective plan views of the ground next to the driver's door of the motor vehicle according to the invention, which plan views clarify the process of switching on the installed projection modules.

An embodiment of a motor vehicle according to the invention with a surroundings lighting device is described below, which device comprises, for each side of the motor vehicle, three respective projection modules for laterally illuminating the region next to the person entry doors of the motor vehicle.

FIG. 1 shows a side view of the motor vehicle in the form of the passenger car 1. The passenger car comprises on the illustrated left-hand side a driver's door 2 as well as a rear door 3. In an analogous fashion, a front seat passenger's door 2' and a rear door 3' lying behind it are provided on the opposite side of the vehicle (FIG. 2). In the embodiment in FIG. 1, a first projection module 7 is installed in the door sill 4 underneath the doors 2 and 3. The projection module is located at the front end of the door sill 4 in the region of the wheel case 5 which surrounds the wheel 6. The first projection module comprises an array made of micro-lenses, in order as a result to selectively generate a predetermined light distribution LV next to the doors 2 and 3 of the motor vehicle.

The projection display, which is described in documents DE 10 2009 024 894 A1, DE 10 2011 076 083 A1 and DE 10 2013 211 877 A1 which have already been cited above is preferably used as the first projection module. In this projection module, a multi-channel optics system with a two-dimensional arrangement of projection optics systems comprising micro-lenses is used to project an image. In the embodiment described here, the projection module comprises an LED as the light source. The projection module is very compact and has dimensions in the centimeter range. In one variant, the width, height and length of the projection module are each approximately 15 mm. Each projection optics system of the projection module generates the same individual image, and the entire image is composed of the superimposition of these individual images. In the embodiment described here, the entire image is a corresponding light distribution which is projected onto the ground in the surroundings of the motor vehicle. In FIG. 1, the propagation direction of the light of the projection module 7 which is directed onto the ground is denoted. by the reference number 8.

In addition to the first projection module 7, a second projection module 9 is also installed in the external rear view mirror 11 of the driver's door 2, the projection module 9 being composed in the embodiment described here of just a single projection optics system and not of an array of projection optics systems. With this second projection module, in addition to the light distribution LV a pictogram in the form of a logo is projected next to the driver's door, as is explained below with reference to FIGS. 3 to 5. Moreover, in the embodiment described here a third projection module 10, which, by analogy with the second projection module 9, has just a single projection optics system, is provided in the door pocket on the inner side of the driver's door 2. When the driver's door is opened, this third projection module 10 projects a further pictogram in the form of a logo onto the light distribution LV, as is also explained below with reference to FIGS. 3 to 5.

The light distribution LV, projected onto the ground next to the vehicle 1, of the first projection module 7 can be seen in the plan view in FIG. 2 and generates the effect of a carpet of light. In this context, it is to be noted that the light distribution is reproduced, in contrast to that in FIG. 1, to the right next to the vehicle 1 adjacent to the doors 2' and 3'. This is possible because first projection modules 7 are installed symmetrically on the right-hand and left-hand sides in the motor vehicle. In other words, correspondingly reflected light distributions are generated both on the left-hand side and on the right-hand side of the vehicle, adjacent to the entry doors. In the same way, second projection modules 9 are installed in the respective external rear view mirrors and third projection modules 10 are installed in the respective door pockets, symmetrically on the left-hand and right-hand sides. The projection modules on both sides of the motor vehicle are activated according to the same schema described below.

For reasons of clarity, FIG. 2 represents only the light distribution adjacent to the doors 2' and 3'. In the exemplary embodiment in FIG. 2, the light distribution LV constitutes a pattern of parallel stripes made of white light which proceed obliquely with respect to the longitudinal axis of the motor vehicle. The stripes are illustrated in a dark fashion and in the actual light distribution they represent bright bars on the ground next to the vehicle. As is apparent from FIG. 2, the light distribution widens from the front door 2' toward the region behind the door 3'. It is also apparent that the pattern of stripes of the light distribution in the rear region floats, which effect is generated by decreasing brightness of the stripes.

The pattern of stripes illustrated is only exemplary of a generated light distribution and any other desired pattern can be generated. In particular, a pattern of dots can, if appropriate, also be represented by the light distribution. Furthermore, the stripes of the pattern of stripes can also run in a different direction, e.g., parallel to the longitudinal axis of the vehicle, or perpendicularly with respect thereto.

The light distribution LV described above contains only white light without colored components, in order to satisfy legal requirements. In the same way, the logo 12 which is generated by the second projection module 9 (see FIGS. 3 to 5) contains only white light, in order to satisfy legal requirements. In contrast to this, the logo 13 which is generated by the third projection module 10 can be colored, since the projection module 10 is located on the inner side of the vehicle door and therefore constitutes interior lighting which can also be configured in a colored fashion.

The surroundings lighting device which is shown in FIG. 1 and FIG. 2, with the projection modules 7, 9 and 10, is actuated by means of a control device (not shown) in such a way that a lighting scenario with high dynamics is generated when the driver approaches his vehicle. The dynamic lighting scenario can be triggered by two events. On the one hand, the driver can bring about the unlocking of the vehicle by operator control of the identification encoder by means of an identification encoder carried along on his person for keyless vehicle access, in response to which the dynamic lighting scenario is also triggered. On the other hand, the vehicle can detect that the distance of the identification encoder, carried along by the driver, from the vehicle or from a wireless receiver position on the vehicle undershoots a predetermined threshold, in response to which the dynamic lighting scenario is also started. The expiry of the dynamic lighting scenario for the vehicle in FIG. 1 and FIG. 2 is explained below with reference to FIGS. 3 to 5.

Figure 4:
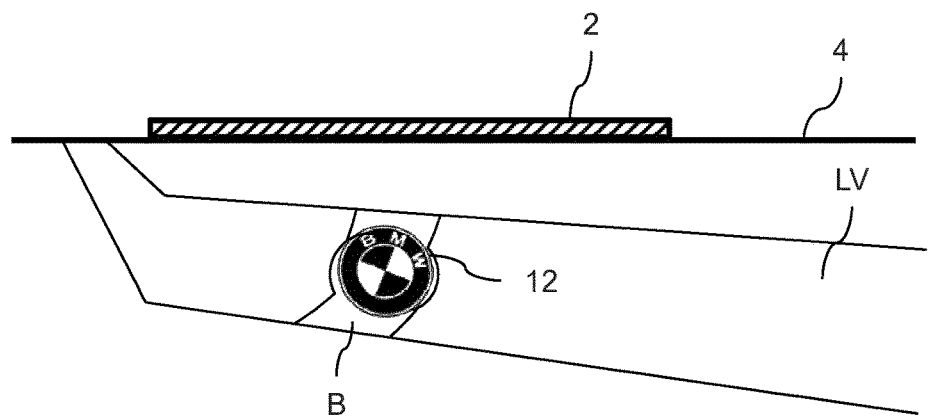
Figure 5:
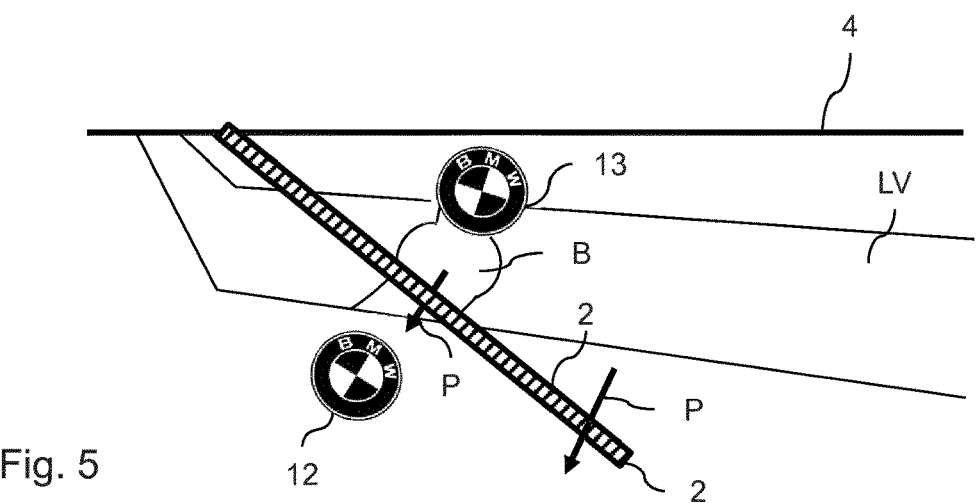

FIGS. 3 to 5 show schematic plan views of the ground next to the driver's door 2 of the vehicle 1. The driver's door 2 is represented merely in a schematic fashion as a hatched rectangle. Likewise, the door sill 4 is indicated only schematically by a line. Moreover, for the sake of clarity only the contour of the light distribution LV is represented without a corresponding pattern. If henceforth the approaching of the driver to the vehicle or the unlocking of the vehicle is detected by the mobile identification encoder, the light distribution LV is firstly generated by switching on the projection module 7 on the ground next to the driver's door 2. This is represented in FIG. 3. Through the positioning of the projection module 7 on the door sill 4 the position of this light distribution does not change, even if the driver's door 2 is opened. In the embodiment described here, the light distribution LV contains a region B which is darker than the sections of the light distribution which are adjacent to the region B. in this region B, the logos 12 and 13 which are explained below are subsequently projected. By means of the light distribution LV very good illumination of the region in front of the driver's door 2 is achieved, as a result of which the driver's entry is facilitated.

As is shown in FIG. 4, after switching on the projection module 7, with a certain time delay, such as after several seconds, the second projection module 9 is switched on and then projects the logo 12 into the light distribution LV, specifically precisely in the region B described above. Since this region is darker than the rest of the light distribution, the logo is particularly salient. The logo 12 is the emblem of the vehicle manufacturer. However, any other desired logos or pictograms can also be projected into the light distribution LV by means of the projection module 9.

The light distribution in FIG. 4 is maintained until the driver of the vehicle opens the driver's door 2, which is indicated in FIG. 5 by the arrows P. As a consequence of the opening of the driver's door, the logo 12 moves out of the light distribution LV owing to the attachment of the projection module 9 to the external rear view minor 11. The logo is slowly dimmed, i.e., it becomes darker and darker the larger the opening angle of the driver's door 2. At the maximum opening angle, the logo 12 can no longer be seen. However, in order to continue to display the manufacturer's emblem to the driver when the driver's door is opened, the projection module 10 in the pocket on the inner side of the door is activated when the driver's door is opened. This projection module projects the further logo 13 onto the ground next to the entry. The logo 13 corresponds in form and size to the logo 12, but is configured in a colored fashion. As a result of the pivoting of the vehicle door, the logo 13 moves away from the door sill 4. In the embodiment described here, at the maximum opening angle of the vehicle door the logo 13 assumes precisely the same position as the logo 12 when the vehicle door is closed. The logo 13 and the light distribution LV are switched off again as soon as the driver has entered the vehicle and has closed the driver's door.

The embodiments of the invention which are described above have a series of advantages. In particular, a functional combination of a plurality of light functions which are matched graphically and in terms of design mechanics is achieved by the use of a plurality of projection modules. This combination brings about, on the one hand, an access into the vehicle which is illuminated in an optimum way and generates, on the other hand, high dynamics and colored accents in the light graphics on the ground.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

LIST OF REFERENCE SYMBOLS

1 Motor vehicle
2,2',3,3' Vehicle doors
4 Door sill
5 Wheel case
6 Wheel
7 First projection module
8 Light propagation
LV Light distribution
9 Second projection module
10 Third projection module
11 External rear view mirror
12 Pictogram
13 Further pictogram
B Visually offset region in the light distribution

What is claimed is:
1. A motor vehicle, comprising:
a surroundings lighting device, wherein the surroundings lighting device comprises:
a first projection module which is disposed in an immobile vehicle body part that is adjacent to a pivotable vehicle door of the motor vehicle, wherein when the first projection module is switched on, the first projection module projects a light distribution onto ground adjacent to the immobile vehicle body part; and
a second projection module which is disposed on an outer side of the pivotable vehicle door, wherein when the second projection. module is switched on, the second projection module projects a pictogram onto the ground;
wherein the surroundings lighting device is configured to, when an event that is triggered by a user in a surrounding of the motor vehicle is detected, switch on the first projection module and at a same time, or after a delay, switch on the second projection module such that the pictogram of the second projection module is projected onto the light distribution of the first projection module.

2. The motor vehicle as claimed in claim 1, wherein the event is an operator control operation of a mobile identification encoder by the user in the surrounding of the motor vehicle and/or an undershooting of a distance between the motor vehicle and the mobile identification encoder, wherein the mobile identification encoder is carried by the user and is assigned to the motor vehicle.

3. The motor vehicle as claimed in claim 1, wherein when the first projection module is switched on partial regions of the light distribution are successively projected onto the ground until an entire light distribution of the light distribution is projected onto the ground.

4. The motor vehicle as claimed in claim 2, wherein when the first projection module is switched on partial regions of the light distribution are successively projected onto the ground until an entire light distribution of the light distribution is projected onto the ground.

5. The motor vehicle as claimed in claim 1, wherein the second projection module is disposed in an external rear view mirror of the pivotable vehicle door or in a camera holder of the pivotable vehicle door.

6. The motor vehicle as claimed in claim 2, wherein the second projection module is disposed in an external rear view mirror of the pivotable vehicle door or in a camera holder of the pivotable vehicle door.

7. The motor vehicle as claimed in claim 3, wherein the second projection module is disposed in an external rear view mirror of the pivotable vehicle door or in a camera holder of the pivotable vehicle door.

8. The motor vehicle as claimed in claim 1, wherein a predefined region in the light distribution is projected visually darker than sections of the light distribution which are adjacent to the predefined region and wherein the pictogram of the second projection module is projected into the predefined region.

9. The motor vehicle as claimed in claim 2, wherein a predefined region in the light distribution is projected visually darker than sections of the light distribution which are adjacent to the predefined region and wherein the pictogram of the second projection module is projected into the predefined region.

10. The motor vehicle as claimed in claim 3, wherein a predefined region in the light distribution is projected visually darker than sections of the light distribution which are adjacent to the predefined region and wherein the pictogram of the second projection module is projected into the predefined region.

11. The motor vehicle as claimed in claim 5, wherein a predefined region in the light distribution is projected visually darker than sections of the light distribution which are adjacent to the predefined region and wherein the pictogram of the second projection module is projected into the predefined region.

12. The motor vehicle as claimed in claim 1, wherein the surroundings lighting device is further configured to, after the first and the second projection modules have been switched on, immediately switch off or dim the pictogram of the second projection module when the pivotable vehicle door is opened.

13. The motor vehicle as claimed in claim 2, wherein the surroundings lighting device is further configured to, after the first and the second projection modules have been switched on, immediately switch off or dim the pictogram of the second projection module when the pivotable vehicle door is opened.

14. The motor vehicle as claimed in claim 3, wherein the surroundings lighting device is further configured to, after the first and the second projection modules have been switched on, immediately switch off or dim the pictogram of the second projection module when the pivotable vehicle door is opened.

15. The motor vehicle as claimed in claim 5, wherein the surroundings lighting device is further configured to, after the first and the second projection modules have been switched on, immediately switch off or dim the pictogram of the second projection module when the pivotable vehicle door is opened.

16. The motor vehicle as claimed in claim 8, wherein the surroundings lighting device is further configured to, after the first and the second projection modules have been switched on, immediately switch off or dim the pictogram of the second projection module when the pivotable vehicle door is opened.

17. The motor vehicle as claimed in claim 1, wherein the surroundings lighting device further comprises a third projection module which is disposed on an inner side of the pivotable vehicle door, wherein when the pivotable vehicle door is opened after the first and the second projection modules have been switched on, the third projection module projects a further pictogram onto the ground, wherein the further pictogram moves into the light distribution when the pivotable vehicle door is opened.

18. The motor vehicle as claimed in claim 17, wherein the further pictogram has a same shape as the pictogram of the second projection module.

19. The motor vehicle as claimed in claim 17, wherein at a maximum opening angle of the pivotable vehicle door the further pictogram is disposed at a position of the pictogram of the second projection module when the vehicle door is closed.

20. The motor vehicle as claimed in claim 17, wherein a brightness of the further pictogram increases slowly when the pivotable vehicle door is opened.

* * * * *